United States Patent [19]

Johansson et al.

[11] Patent Number: 4,636,029

[45] Date of Patent: Jan. 13, 1987

[54] APPARATUS FOR DETECTING TAPPING OF LIGHT ENERGY FROM AN OPTICAL FIBER

[75] Inventors: Jan U. S. Johansson, Bromma; Gunnar S. Forsberg, Stockholm; Viesturs J. Vucins, Älta, all of Sweden

[73] Assignee: Telefonaktiebolaget LM Ericsson, Stockholm, Sweden

[21] Appl. No.: 626,639

[22] Filed: Jul. 2, 1984

[30] Foreign Application Priority Data

Sep. 1, 1983 [SE] Sweden ........................... 8304733

[51] Int. Cl.$^4$ .............................................. G02B 6/28
[52] U.S. Cl. ................................. 350/96.16; 340/555
[58] Field of Search ............... 350/96.16; 340/555, 340/556, 600, 870.09

[56] References Cited

U.S. PATENT DOCUMENTS

| | | | |
|---|---|---|---|
| 4,211,920 | 7/1980 | Wakabaashi | 350/96.16 |
| 4,249,266 | 2/1981 | Nakamori | 350/96.16 |
| 4,292,628 | 9/1981 | Sadler | 340/555 |
| 4,379,289 | 4/1983 | Peek | 340/555 |
| 4,399,430 | 8/1983 | Kitchen | 340/555 |
| 4,399,563 | 8/1983 | Greenberg | 350/96.16 |
| 4,435,850 | 3/1984 | Bowen et al. | 340/555 |
| 4,450,434 | 5/1984 | Nielson et al. | 340/555 |
| 4,521,767 | 6/1985 | Bridge | 340/555 |

*Primary Examiner*—William L. Sikes
*Assistant Examiner*—Robert E. Wise
*Attorney, Agent, or Firm*—Roberts, Spiecens & Cohen

[57] ABSTRACT

In a data transmission system where a computer side and a terminal side are connected with the aid of an optical fiber cable (FK), unauthorized tapping of light energy from some fiber in the cable can be detected. The transmitted signals are assumed to be shot-noise limited, i.e. the transmitted light is heavily superposed, whereby a large part of the transmitted light must be tapped off for listening. The computer side and terminal side contain level-sensing circuits (NVK1,NVK2) connected to respective receiver units (MD,MT) which send an alarm when tapping takes place. An optical fiber relay (RK) is connected between the fiber cable (FK) and the terminal side for short-circuiting this side in the case where a power failure can occur.

5 Claims, 4 Drawing Figures

APPARATUS FOR DETECTING TAPPING OF LIGHT ENERGY FROM AN OPTICAL FIBER

TECHNICAL FIELD

The present invention relates to an apparatus for detecting tapping of light energy from a fiber in an optical glass fiber cable connected between two transmitter-receiver units, for example. More specifically, there is intended an apparatus which makes it possible to discover unauthorized listening to information which is transmitted through the cable via optical signals.

BACKGROUND ART

Many methods have been used and measures taken for preventing listening to information which is sent in the form of electrical or optical signals between two points.

One method is to encode the information which is to be transmitted in the transmitter unit and then decode this information in the receiver unit. This results in being able to use a relatively cheap transmission medium, but the encoding equipment is generally expensive and decoding by unauthorized persons is possible.

One measure is to mechanically or electromechanically protect the cable against unauthorized tampering or listening. This can also result in large costs, e.g. for mechanical protection by means of lead pipes, and does not remove the risk of listening with the aid of mechanical tampering.

A further known method consists of integrating electrical conductors into the fiber cable transmitting the information. When the cable is tampered with the capacitance between the electrical conductors is altered. If an alteration is detected an alarm can be sent, resulting in that the information transmission can be stopped. Although this method results in sure protection against listening, high costs are unavoidable.

DISCLOSURE OF INVENTION

In an optical glass fiber of the multimode type, the propagation of light takes place in the fiber with the aid of a plurality of propagation modes, the light being attenutated differently depending on the mode with which propagation takes place. The light spread in the fiber, with accompanying attenuation, can occur by mechanical deformation of the fiber or so-called tunnelling of the modes close to cut-off. If a fiber is intentionally tapped for light energy for the purpose of extracting transmitted information, certain modes are affected, which results in all the other modes being affected. This leads to energy being redistributed from conducting to non-conducting modes and the power distribution in the fiber core and sheath are altered.

By thus uncovering the fiber in the cable and subjecting it to bending, and collecting the leaking radiation on a photodetector there is a possibility of tapping an optical fiber for information. Another technique for tapping is also possible, e.g. by cementing the fiber into a silicon block with a bent U-shape, grinding off the fiber through the sheath to the core and connecting a detector. However, the methods result in that the optical mean power in the transmitting fiber is changed, since signal power is tapped for listening.

The apparatus in accordance with the present invention is based on the situation established above, and monitors the optical fiber cable even when one terminal is not in use.

In accordance with a characterizing feature of the invention, an optical fiber connection of the usual type is monitored without any extra measures for protecting it by the optical mean power level being detected, an alarm signal being given when this is changed from a given reference value. This requires, however, that the optical signal is coded so that it has a constant mean power independent of its information content. A further distinguishing feature of the present invention is that the transmitters on both sides of the optical connection transmit heavily superposed light (so-called shot-noise limitation) through the connection. This results in that the quantum noise of the transmitters will be great, but means at the same time that a receiver possibly connected into the communication will also get a high noise contribution, resulting in turn that a large part of the transmitted light (about 50%) must be tapped off for useful detection to take place. However, such a tap will be detected and may result in an alarm signal.

The apparatus in accordance with the invention is characterized as disclosed in the following claims.

BRIEF DESCRIPTION OF DRAWING

The invention will now be described in detail with reference to the appended drawing on which.

BEST MODES FOR CARRYING OUT THE INVENTION

Figure 1:
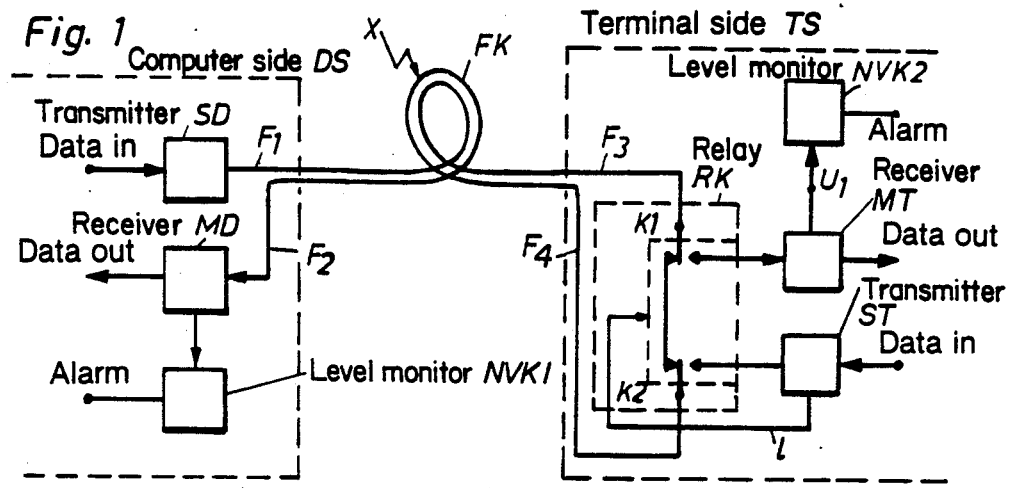
FIG. 1 is a block diagram of a transmission link containing an apparatus in accordance with the invention.

An embodiment of the invention is illustrated in FIG. 1, and applied to a computer side DS and a terminal side TS. Both computer side DS and terminal side TS can send and receive data signals via an optical fiber cable FK in a conventional manner. The cable FK is a normal, cheap, optical fiber cable without any special protective arrangements.

In the embodiment illustrated, the computer side DS consists of a tranmitter unit SD receiving data in uncoded form and sending via the fiber link $F_1$ an information signal which can be conventionally coded or modulated. A receiver MD included in the computer side DS receives a coded or modulated information signal in the form of light energy in the receiving fiber link $F_2$. The transmitter unit SD and receiver unit MD are known per se. A level monitoring circuit NVK1 is connected to the receiver MD such that it senses an electrical counterpart to the received optical signal in the fiber link $F_2$ and when the sensed level is above or below a given value an alarm is sent.

The terminal side TS includes a photoelectric receiver MT and a transmitter ST. The input of the receiver MT is connected to the incoming fiber link $F_3$ via a switch K1, and the transmitter ST is connected to the outgoing fiber link $F_4$ via a second switch K2. Both switches K1 and K2 are connected to each other such that when they are closed both fiber links $F_3$ and $F_4$ are directly connected to each other, whereby the terminal side will be optically shortcircuited. When the switches K1 and K2 are open they are connected such that the optical signals in the respective fiber link are taken to the receiver MT and from the transmitter ST, respectively. The switches K1, K2 may be an optical fiber relay RK of a known kind described in the Swedish Patent Application 8204085-8, for example. The relay RK is steered to both its switching positions via a connection 1 from the transmitter ST so that the switches K1 and K2 are closed when the terminal (transmitter) is closed, or should current supply to the terminal side fail.

As with the computer side, the terminal side DS has a level monitoring circuit NVK2 connected to the receiver MT of the terminal side, for sensing an electrical correspondence to the incoming and received optical fiber signal in the link F3. The optical fiber links F1,F3 and F2,F4 are combined in the optical fiber cable FK, which is of conventional implementation without any particular protection. The computer and terminal sides should be electromagnetically screened however, to prevent unauthorized listening.

If the fiber cable is tampered with at some place X, e.g. if one of the fibers is bent or uncovered so that light energy leaks out into the surroundings, the optical mean power will be changed, which is detected by the level monitoring circuit NVK2 if the relay RK is in its open position, i.e. if the terminal side is functioning normally. Should the terminal side be out of service, i.e. it has been closed, the relay K2 is in the closed position and possible light signals are taken back to the receiver MD on the computer side. Should there be possible tampering with the cable FK, an alteration of the optical fiber mean power will be sensed instead by the level monitoring circuit NVK1 and an alarm sent from this circuit.

In calculating the noise properties of a optical fiber receiver, all noise is referred to the input of the receiver where the photodiode is connected. The higher this noise is, the poorer is the receiver's sensitiveness. Only the two most important noise contributions will be mentioned here, when the photodiode consists of a PIN diode, namely resistive noise $N_1 = (4kTB/R)(1)$ and quantum noise $N_2 = 2qIB(2)$ where k = Boltzmann's constant
T = Absolute temperature
B = Receiver noise bandwidth
L = Receiver input resistance or transimpedance or both in parallel
q = Electron charge
I = Current through photodiode The smaller the expressions (1) and (2) are, the more sensitive is the receiver. There is an optimum bandwidth Bj for a given bit rate, which means that B cannot be reduced below the optimum value. On the other hand, T can be reduced and R can be made very large. This means that the expression (1) can be reduced so that the noise $N_1$ is negligible. In practice, all noise contributions can be heavily reduced except the quantum noise $N_2$ according to (2).

If now a strong constant light is used, on which the information carrying signal is superposed, the expression (2) will dominate, quite irrespective of the remaining noise properties of the receiver. In the present invention, the quantum noise according to expression (2) is made great by the superposed light increasing the current I, all types of receivers thus obtaining in principle the same "poor" sensitivity. This means that if someone with a small tap at X wants to listen to the transmission of the optical signals through the communication link FK, it does not pay to use a supersensitive receivers, since all types of receiver have the same sensitivity, according to the above. When the expression (2) dominates, the signal: noise relationship in the receiver is proportional to P/2qB (P = optical power). Tapping a small part of the power thus gives an insufficiently good signal in relation to the noise conditions in the listening receiver. For listening to be possible it is thus required that a relatively large part of the light power must be tapped at X, in the order of magnitude 25%. Furthermore, the receiver at X must use the greater part of the light which the fiber FK loses, which is impossible in practice. If such a large portion of the light is tapped, the level monitoring according to the above will come into action, however.

When the relay RK changes state, the mean power of the noise signals in the fiber is also changed. This change shall not cause an alarm in or after the respective level monitoring circuits NVK1, NVK2. These circuits can be designed so that an alteration of short duration of the mean power is not detected.

Figure 2:
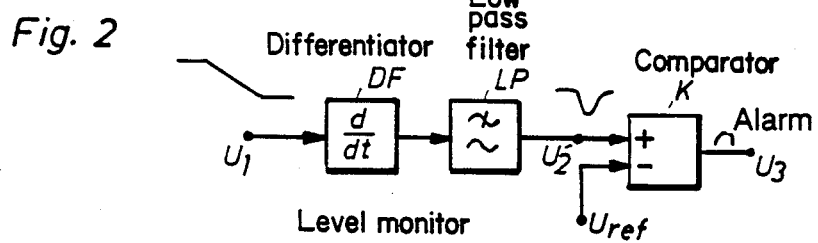
FIG. 2 is a block diagram of a level monitoring circuit included in the inventive apparatus.

FIG. 2 illustrates the block diagram for an embodiment of the level monitoring circuit NVK1 or NVK2. A differentiator DF, the input of which forms the input of the circuit, is connected by its output to the input of a lowpass filter LP. Its output is connected to one input of a comparator K, the other input of which is connected to a reference voltage $U_{ref}$. A voltage $U_3$ is obtained at the comparator output, which forms the alarm output of the level monitoring circuit. The input voltage to the differentiator DF is denoted by $U_1$.

The differentiator DF and lowpass filter LP may for example comprise a feedback operation amplifier with two RC circuits, which gives a Bode diagram with two breaking points, of which the lower point occurs at low frequency (about 1 Hz).

Figure 3:
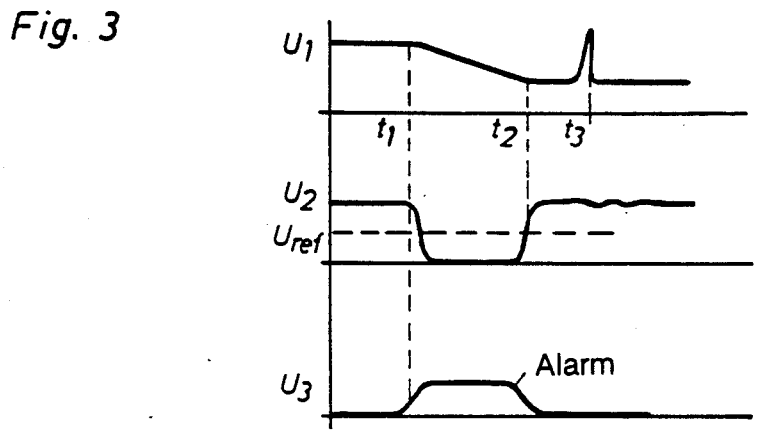
FIG. 3 is a time chart.

When light energy is tapped off from the cable FK, there is a slow or rapid lowering of the level of the input voltage $U_1$ to the differentiator DF, as is illustrated in the time chart according to FIG. 3, between the times $t_1$ and $t_2$. The lowpass filter LF give an output voltage $U_2$ to one input of the comparator K, this voltage being a very low-frequency signal, which due to the weak gradient of the incoming signal voltage $U_1$ is given a low value after the differentiation. In FIG. 3 the gradient of the voltage $U_1$ between the times has been exaggerated better to illustrate the sequence. The low level of $U_2$ is compared in the comparator K with a reference levl $U_{ref}$ of a suitably selected size, and if the level of $U_2$ falls below the reference level $U_{ref}$ an output voltage $U_3$ comes from the comparator, this voltage constituting the alarm signal.

As mentioned above, switching of the relay RK is obtained for an activation signal via the connection 1. This generally gives rise to an alteration of short duration of the light flow in the fiber F3–F4, which is assumed to result in a voltage crest at the time $t_3$ in FIG. 3. An unillustrated delay circuit may possibly be connected after the comparator K to given an output signal $U_3$ only if the voltage decline in $U_2$ has existed for a given time $t_2-t_1$.

In the embodiment described above the level-sensing or level monitoring circuit measures an alteration in an electric signal, corresponding to the light level in the fiber, relative a reference level, i.e. a relative change in level. It is also possible to measure the absolute level of the optical power, or a combination of both.

The optical fiber relay RK connected on the terminal side is used to obtain a detection signal on the computer side in the case where the terminal side is closed or has a power failure. In another embodiment of the apparatus, a relay may be connected in a similar way on the computer side as well, for obtaining a detection signal on the terminal side should there be a power failure on the computer side.

Figure 4:
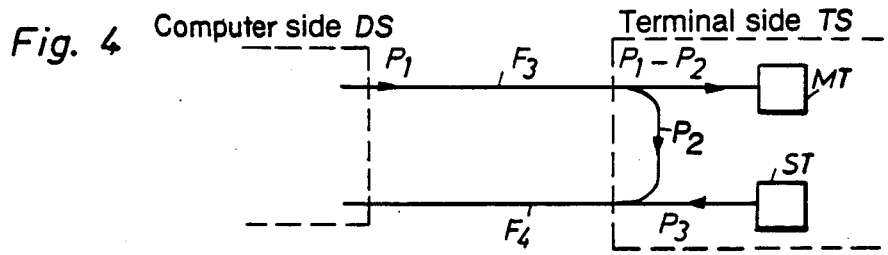
FIG. 4 schematically illustrates an alternative embodiment of the apparatus in accordance with the invention.

It is also possible to obtain a detection signal on the terminal side (or the computer side) by utilizing an optical fiber parallel connection instead of a relay according to FIG. 1. FIG. 4 schematically illustrates how such a connection in parallel can be carried out. The computer side sends out the power $P_1$ and a portion $P_2$ of the power $P_1$ is tapped. The power $P_2 + P_3$ is then sent back again to the computer side. Since $P_2 << P_3$, the information embodied in the power $P_2$ has no effect on the computer side, since digital receivers can withstand considerable crosstalk from other channels.

If there is a power failure on the terminal side, the power $P_3 = 0$ and only the power $P_2$ is sent back again to the computer side. The power $P_2$ is indeed so weak that the computer side cannot detect any information in $P_3$. This is entirely without significance however. The main thing is that the level monitoring circuit NVK1 on the computer side is in the case sufficiently sensitive to detect possible changes in the power $P_2$. The circuit NVK1 is sufficiently sensitive, since it works within a very narrow frequency range. The disadvantage in tapping optical fiber power according to FIG. 4 is however that greater losses are obtained than if an optical fiber relay is used. It has been assumed in the above embodiment that a rupture can occur in the current supply, resulting in the use of an optical fiber connecting means. If current supply can always be maintained to the terminal side, no such optical fiber connection means (relay or optical parallel connection) is needed.

What is claimed is:

1. In an optical data transmission system having a first-transmitter-receiver with a transmitter for optically transmitting coded information and a receiver for optically receiving coded information, a second transmitter-receiver with a transmitter for optically transmitting coded information and a receiver for optically receiving coded information, fibre optical cable means having a first fibre for connecting the transmitter of the first transmitter-receiver to the second transmitter-receiver and a second cable for connecting the second transmitter-receiver to the receiver of the first transmitter-receiver, apparatus for detecting the tapping of a light energy from the fibre optical cable means comprising a first signal level sensing means in the first transmitter receiver and connected by the receiver thereof for giving an alarm when the level of the received signals falls below a predetermined level, a second signal level sensing means in the second transmitter-receiver for giving an alarm when the level of the received signal falls below a predetermined level, and relay means in the second transmitter-receiver which is in a first state when the second transmitter-receiver is operative and in a second state when the transmitter-receiver is not operative, said relay means including means for feeding signals from the first optical fibre to the receiver of the second transmitter-receiver and for feeding signals from the transmitter of the second transmitter-receiver to the second optical fibre when in the first state and including further means for feeding signals from the first optical fibre to the second optical fibre when in the second state.

2. The apparatus of claim 1 wherein at least one of the transmitters includes means for transmitting shot-noise-limited light.

3. The apparatus of claim 2 wherein the relay means is an optical fibre relay.

4. The apparatus of claim 2 wherein said first signal level sensing means is connected to the receiver of the first transmitter-receiver and comprises a signal differentiator means receiving electrical signals from said receiver for transmitting a differentiated electrical signal, a low pass filter means receiving the differentiated electrical signal for transmitting a low-pass filtered signal and means for sensing the level of the low-pass filtered signal for giving an alarm when said signal exceeds a given amplitude.

5. The apparatus of claim 1 wherein the relay means is an optical fibre relay.

* * * * *